United States Patent
Mutnuru

(10) Patent No.: US 11,546,301 B2
(45) Date of Patent: Jan. 3, 2023

(54) METHOD AND APPARATUS FOR AUTONOMOUS FIREWALL RULE MANAGEMENT

(71) Applicant: ORACLE INTERNATIONAL CORPORATION, Redwood Shores, CA (US)

(72) Inventor: Rishi Mutnuru, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 241 days.

(21) Appl. No.: 16/990,574

(22) Filed: Aug. 11, 2020

(65) Prior Publication Data

US 2021/0084013 A1    Mar. 18, 2021

Related U.S. Application Data

(60) Provisional application No. 62/900,239, filed on Sep. 13, 2019.

(51) Int. Cl.
*H04L 12/00* (2006.01)
*H04L 9/40* (2022.01)
(Continued)

(52) U.S. Cl.
CPC ...... *H04L 63/0263* (2013.01); *G06F 16/2379* (2019.01); *G06F 16/245* (2019.01); *H04L 41/0886* (2013.01); *H04L 41/0893* (2013.01)

(58) Field of Classification Search
CPC .............. G06F 16/2379; G06F 16/245; H04L 63/0236; H04L 63/0263; H04L 41/0894;
(Continued)

(56) References Cited

U.S. PATENT DOCUMENTS

| 7,665,128 B2 | 2/2010 | Yang |
| 7,797,739 B2 | 9/2010 | Andreev et al. |

(Continued)

FOREIGN PATENT DOCUMENTS

| CN | 108429774 | 8/2018 |
| CN | 109361711 | 2/2019 |
| IN | 201921017918 | 5/2019 |

OTHER PUBLICATIONS

"AWS Firewall Manager", Amazon Web Services, retrieved from https://webcache.googleusercontent.com/search?q=cache:LDaCXabS_t0J:https://aws.amazon.com/firewall-manager/+&cd=1&hl=en&ct=clnk&gl=in on Feb. 12, 2020, 5 pages.

(Continued)

*Primary Examiner* — Frantz Coby
(74) *Attorney, Agent, or Firm* — Tucker Ellis LLP

(57) ABSTRACT

In accordance with an embodiment, described herein is a system and method for autonomous firewall rule management, for use with cloud computing environments or other types of network environments. A firewall rule management automation framework provides rule management for firewalls deployed across availability domains. The system is adapted to automatically determine firewalls that can receive network traffic from a given source subnet or destination subnet; configure the firewalls with required firewall rules; monitor the firewall rules through collection of metrics snapshots and rule hit counts; and purge underused or potentially obsolete firewall rules, for example those having zero hits over a particular period of time or number of snapshots. The system provide generic support for different types of firewall devices, and autonomous management of firewall rules within large heterogeneous computer networks that may include several types of firewalls.

15 Claims, 13 Drawing Sheets

(51) Int. Cl.
*H04L 41/0893* (2022.01)
*G06F 16/23* (2019.01)
*G06F 16/245* (2019.01)
*H04L 41/08* (2022.01)

(58) Field of Classification Search
CPC .. H04L 43/10; H04L 41/0886; H04L 41/0893
USPC ........................................ 709/223–224; 726/1
See application file for complete search history.

(56) References Cited

U.S. PATENT DOCUMENTS

| | | | | |
|---|---|---|---|---|
| 7,853,998 | B2* | 12/2010 | Blaisdell | H04L 63/0227 |
| | | | | 713/153 |
| 8,490,153 | B2 | 7/2013 | Bassett et al. | |
| 8,819,762 | B2* | 8/2014 | Harrison | H04L 63/20 |
| | | | | 726/1 |
| 9,100,363 | B2 | 8/2015 | Burchfield et al. | |
| 9,515,993 | B1 | 12/2016 | Hwang et al. | |
| 9,787,641 | B2 | 10/2017 | Bansal et al. | |
| 10,148,696 | B2* | 12/2018 | Nimmagadda | H04L 63/0263 |
| 10,305,858 | B2* | 5/2019 | Nimmagadda | H04L 63/0263 |
| 10,341,297 | B2* | 7/2019 | Nimmagadda | H04L 41/0895 |
| 10,469,450 | B2* | 11/2019 | Nimmagadda | G06F 21/604 |
| 10,587,578 | B2* | 3/2020 | Kumar | H04L 63/104 |
| 10,608,993 | B2* | 3/2020 | Bansal | H04L 63/0263 |
| 10,785,190 | B2* | 9/2020 | Saavedra | H04L 63/20 |
| 11,115,382 | B2* | 9/2021 | Bansal | H04L 63/0227 |
| 2008/0148381 | A1 | 6/2008 | Aaron | |
| 2018/0324144 | A1* | 11/2018 | Shi | H04L 12/4641 |

OTHER PUBLICATIONS

"Firewall Builder—Features", retrieved from http://fwbuilder.sourceforge.net/4.0/features.shtml on Feb. 12, 2020, 3 pages.

Illumio, "Eliminating Firewall Rule Proliferation", White Paper, published Mar. 2019, retrieved from https://www.illumio.com/resource-center/white-paper-eliminating-firewall-rule-proliferation, 14 pages.

"Monitor Policy Rule Usage", Panorama Administrator's Guide, Version 8.1, retrieved from https://docs.paloaltonetworks.com/panorama/8-1/panorama-admin/manage-firewalls/device-monitoring-on-panorama/monitor-policy-rule-usage on Feb. 12, 2020, 5 pages.

Navarikuth, et al., "A dynamic firewall architecture based on multi-source analysis", published on Nov. 7, 2013, retrieved from https://link.springer.com/article/10.1007/s40012-013-0029-x, 13 pages.

* cited by examiner

METHOD AND APPARATUS FOR AUTONOMOUS FIREWALL RULE MANAGEMENT

CLAIM OF PRIORITY

This application claims the benefit of priority to U.S. Provisional patent application titled "METHOD AND APPARATUS FOR AUTONOMOUS FIREWALL RULE MANAGEMENT", Application No. 62/900,239 filed Sep. 13, 2019; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud computing or other types of network environments, and are particularly related to systems, apparatus, and methods for autonomous firewall rule management in such environments.

BACKGROUND

A cloud computing environment enables access by user devices to software applications and services provided at one or more cloud networks, for example as part of availability domains.

In a typical cloud computing environment there may be hundreds of firewalls front-ending network traffic, or deployed across the various availability domains. From time to time, network administrators or engineers may receive requests to block, or permit, network traffic to or from specified hosts, domains, or servers; for example, to restrict network traffic from being sent to unauthorized destinations, or being received from unauthorized or potentially-infected sources.

Presently-available tools to identify and protect against infected hosts, domains, or servers are limited in their ability to configure the many firewalls within a typical cloud computing environment. Such tools generally require a network administrator or engineer to identify a subset of firewalls that can potentially receive such network traffic, and then configure policies or rules on those firewalls to either block or permit that network traffic as appropriate.

Each such firewall rule adds performance overhead to the operation of the firewall, since the firewall typically evaluates its firewall rules sequentially for a potential match. Firewall rules that are obsolete, in that they are never hit by live network traffic, must be monitored and then manually removed, in order to maintain system performance and ensure that the security offered by such rules will not unduly slow down the network.

SUMMARY

In accordance with an embodiment, described herein is a system and method for autonomous firewall rule management, for use with cloud computing environments or other types of network environments. A firewall rule management automation framework provides rule management for firewalls deployed across availability domains. The system is adapted to automatically determine firewalls that can receive network traffic from a given source subnet or destination subnet; configure the firewalls with required firewall rules; monitor the firewall rules through collection of metrics snapshots and rule hit counts; and purge underused or potentially obsolete firewall rules, for example those having zero hits over a particular period of time or number of snapshots. The system provide generic support for different types of firewall devices, and autonomous management of firewall rules within large heterogeneous computer networks that may include several types of firewalls.

DETAILED DESCRIPTION

As described above, although a typical cloud computing environment may include hundreds of firewalls front-ending network traffic, or deployed across various availability domains, presently-available tools generally require a network administrator or engineer to identify a subset of firewalls that can potentially receive network traffic, and then configure policies or rules on those firewalls to either block or permit that network traffic as appropriate. Firewall rules that are obsolete must be monitored and then manually removed, in order to maintain system performance and ensure that the security offered by such rules will not unduly slow down the network.

For example, an environment comprising 350 firewalls, with 100 rules per firewall, would result in 35,000 rules that must be configured and updated; and the number of such rules, including some that may be obsolete, can adversely affect system performance.

In accordance with an embodiment, described herein is a system and method for autonomous firewall rule management, for use with cloud computing environments or other types of network environments.

A firewall rule management automation framework provides rule management for firewalls deployed across availability domains. The system is adapted to automatically determine firewalls that can receive network traffic from a given source subnet or destination subnet; configure the firewalls with required firewall rules; monitor the firewall rules through collection of metrics snapshots and rule hit counts; and purge underused or potentially obsolete firewall rules, for example those having zero hits over a particular period of time or number of snapshots.

The system provides generic support for different types of firewall devices, and autonomous management of firewall rules within large heterogeneous computer networks that may include several types of firewalls.

In accordance with an embodiment, a technical advantage of the systems and methods described herein includes autonomous management of firewall rules within cloud computing environments or other types of network environments that may include a variety of different types of firewall devices; including automatic configuration of firewalls with rules to reflect the network traffic being processed; coupled with automatic purging of underused or potentially obsolete rules that are no longer applicable to that network traffic.

The described approach also reduces the need for human intervention and labor in the configuration of large amounts of firewalls, and results in overall better system performance.

Additional advantages and benefits will be evident based on the description of various embodiments provided herein.

Cloud Computing Environments

Figure 1:
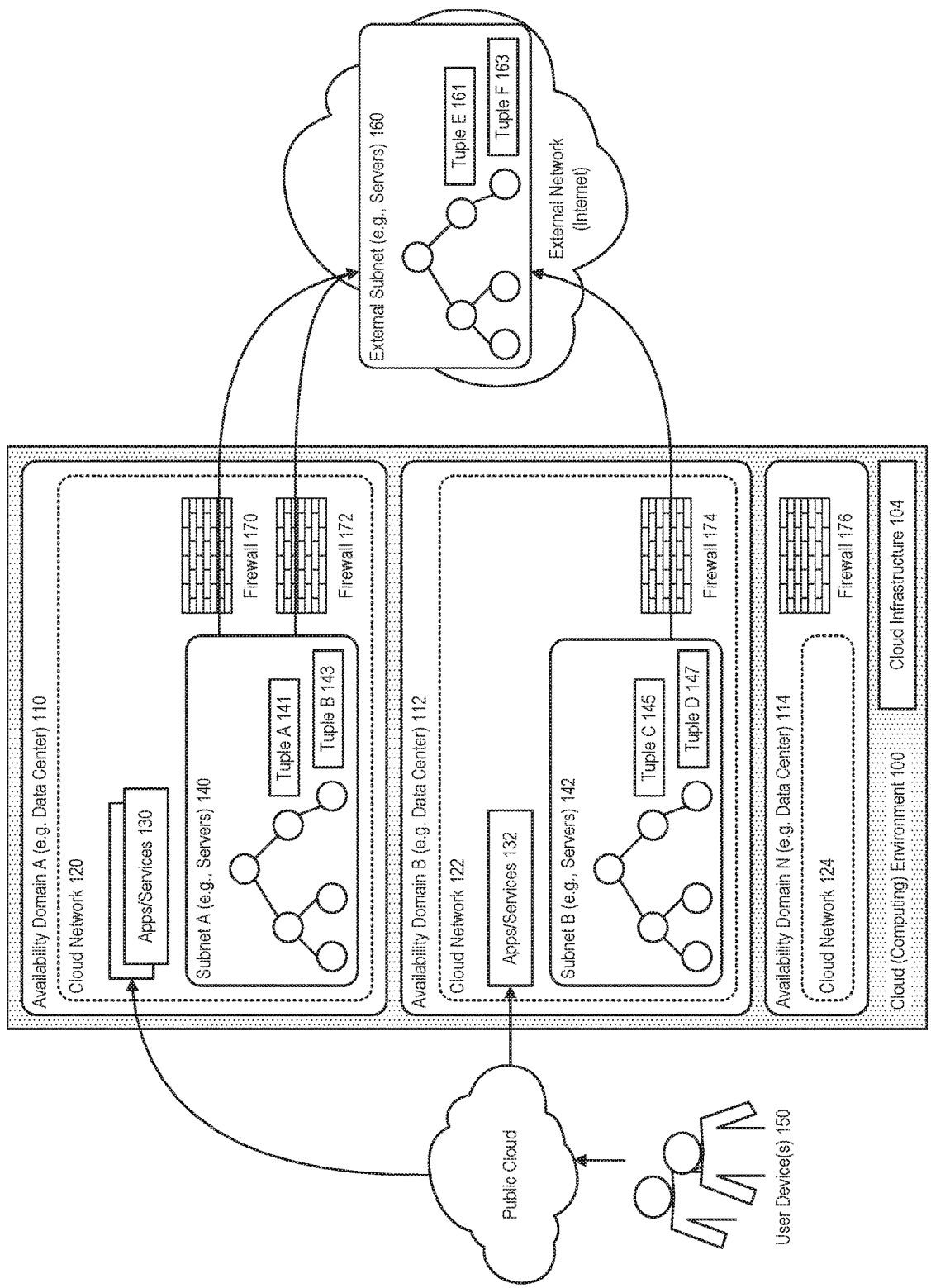
FIG. 1 illustrates an example of a cloud computing environment which utilizes firewalls, in accordance with an embodiment.

FIG. 1 illustrates an example of a cloud computing environment which utilizes firewalls, in accordance with an embodiment.

As illustrated in FIG. 1, in accordance with an embodiment, a cloud computing environment (cloud environment) 100, including a cloud infrastructure 104 having computing hardware or devices, can provide access, via one or more cloud networks 120, 122, 124 to software applications/services 130, 132, provided within one or more availability domains A 110, B 112, N 114 (for example, as can be provided at a data center) of the cloud environment.

In accordance with an embodiment, each cloud network can include a plurality of network devices, configured as hosts, domains, or servers and operating within one or more subnets, for example A 140, B 142; which can communicate with other subnets within or internal to the cloud environment, or with an external, e.g., Internet-accessible, subnet 160, and which can provide access via a public cloud by one or more user devices 150 or computers to the applications/services provided by the subnets and hosts, domains, or servers In such an environment, network routing enables network traffic to flow between the subnets via the cloud networks.

For example, the user devices can access the hosts, domains, or servers operating within one or more subnets, and the software applications/services provided thereon, subject to any routing restrictions, policies, or rules. Network traffic paths can be configured manually, using static routing, or dynamically with the help of routing protocols, such as the Open Shortest Path First (OSPF), Border Gateway Protocol (BGP), or Routing Information Protocol (RIP).

In accordance with an embodiment, network traffic can be associated with network tuples, which can be used in routing and defining routing policies or rules. For example, the combination of a source IP address, a source port, a destination IP address, a destination port, and a network protocol is generally referred to as a 5-tuple.

For example, as illustrated in the example shown in FIG. 1, network traffic to/from a first host, domain, or server in subnet A can be associated with a 5-tuple (A) 141; while network traffic to/from another host, domain, or server in subnet A can be associated with a different 5-tuple (B) 143. Similarly network traffic to/from a first host, domain, or server in subnet B can be associated with a 5-tuple (C) 145; while network traffic to/from another host, domain, or server in subnet B can be associated with a different 5-tuple (D) 147.

Similarly network traffic to/from a first host, domain, or server in the external subnet can be associated with a 5-tuple (E) 161; while network traffic to/from another host, domain, or server in the external subnet can be associated with a different tuple (F) 163.

The above example of tuples is provided for purposes of illustration, in particular to illustrate that network traffic to/from various hosts, domains, or servers can be associated with various tuples, including the example 5-tuples as illustrated. In accordance with other embodiments, other types of tuples can be used.

In accordance with an embodiment, the subnets and servers therein can communicate network traffic via a plurality of firewalls, for example firewalls 170, 172, 174, 176, as illustrated. Firewalls can be typically deployed in various modes, including for example Network Address Translation (NAT) or route mode that uses a route table to make forwarding decisions; or a transparent mode wherein the device utilizes a Media Access Control (MAC) table to forward packets.

When source interface-based routing is used, routing is based on factors such as the source IP address of the packet and the ingress interface on which the packet arrived. Policy/rule-based routing generally promotes routing decisions based on an examination of 5-tuples, as illustrated above, This ability to route network traffic based on IP and TCP/UDP headers provides improved flexibility to route traffic differently for each application or service.

For example, in a cloud environment that includes many availability domains, hosts, domains, or servers, and applications/services hosted by many cloud customers; each customer can configure their applications/services to only allow access to/from specified subnets or IP addresses.

In such an environment, the firewalls must operate to control this access, and accordingly the firewall rules must be configured appropriately. However, as described at the outset, this can involve considerable amount of human intervention and labor in the configuration of large amounts of firewalls.

The example cloud computing environment illustrated in FIG. 1 is provided for purposes of illustration. In accordance with various embodiments, a cloud network may include either some or all of the components illustrated therein, or may include only a selection of, for example, leaf nodes or cluster members.

Autonomous Firewall Rule Management

In accordance with an embodiment, the system described herein operates on the basis that it is often better to remove a firewall rule from a firewall configuration if that rule is rarely (or never) likely to be applied. The system additionally reduces the need for human intervention to managing the firewall rules.

For example, generally described, the system can operate to determine firewalls in an availability domain for which various rules have been configured, and mark unused rules for deletion, including taking into account whether the associated firewall device has been recently rebooted.

Figure 2:
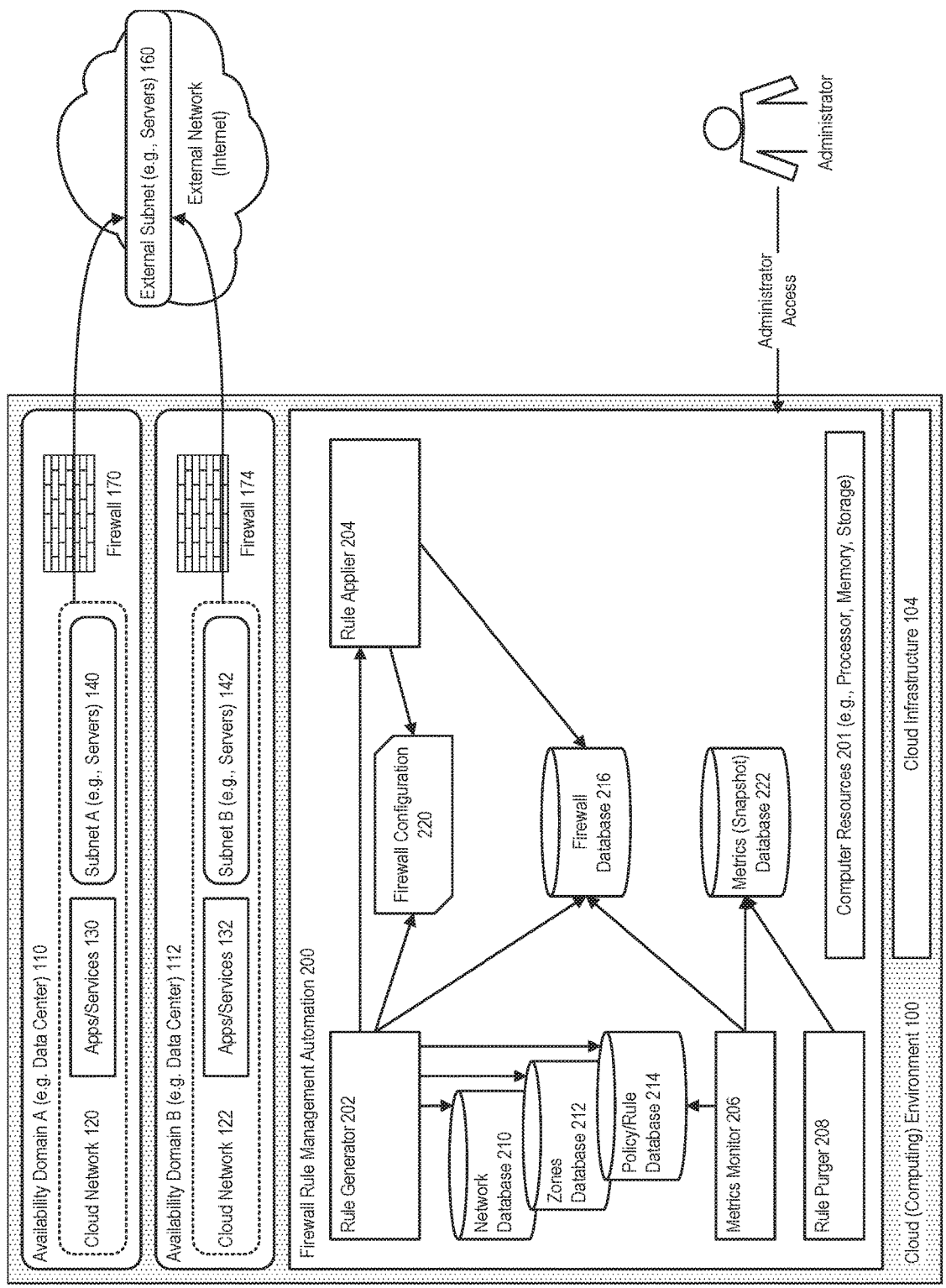
FIG. 2 illustrates a system for autonomous firewall rule management, in accordance with an embodiment.

FIG. 2 illustrates a system for autonomous firewall rule management, in accordance with an embodiment.

As illustrated in FIG. 2, in accordance with an embodiment, the system, referred to here in some instances as a firewall rule management automation framework 200 (FiRMS) can operate at a computer 201 within the cloud environment. Components of the autonomous firewall rule management framework can include, for example, a rule generator 202, a rule applier 204, a metrics monitor 206, and a rule purger 208, as further described below.

In accordance with an embodiment, the system can also include or make use of a network database 210, a zones database 212, a policy/rule database 214, and a firewall database 216, which together can be used to determine a firewall configuration 220; and a metrics (snapshot) database 222, also as further described below.

In accordance with an embodiment, the firewall rule management automation framework and various components and processes illustrated in FIG. 2, and as further described herein with regard to various embodiments, can be provided as software or program code executable by a computer system or other type of processing device.

Rule Generator

In accordance with an embodiment, a network administrator, engineer, or user can input a request associated with a source subnet and a destination subnet, and a protocol, source port and destination ports that are to be blocked or permitted, for example, into the cloud.

In accordance with an embodiment, the rule generator is adapted to search the network database, in addition to the route tables, to identify a set of firewalls and zones where the policy or rule is to be configured to honor the user request.

Figure 3:
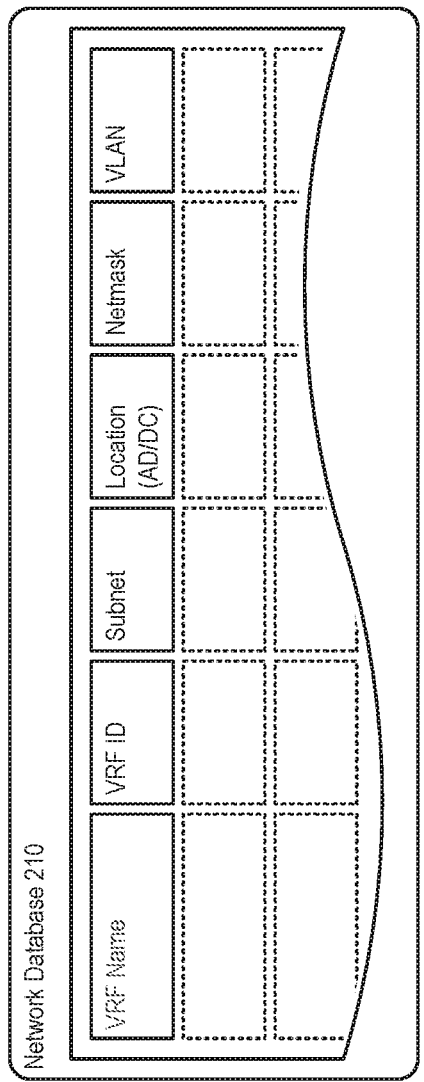
FIG. 3 illustrates an example network database, for use with autonomous firewall rule management, in accordance with an embodiment.

FIG. 3 illustrates an example network database, for use with autonomous firewall rule management, in accordance with an embodiment.

| Network Database | | | | | |
|---|---|---|---|---|---|
| VRF Name | VRF ID | Subnet | Location (AD/DC) | Netmask | VLAN |

As illustrated in FIG. 3, in accordance with an embodiment, an example network database table can include, for example, a virtual routing and forwarding (VRF) name and ID, which allows multiple instances of a routing table to co-exist within a same router at the same time. The network database table can also indicate subnets and locations (for example, availability domains (AD), data centers (DC), and a netmask. A virtual LAN (VLAN) operates as a broadcast domain that is isolated at the data link layer, providing the functionality of network traffic that is physically on a single network but appears as separate networks.

Figure 4:
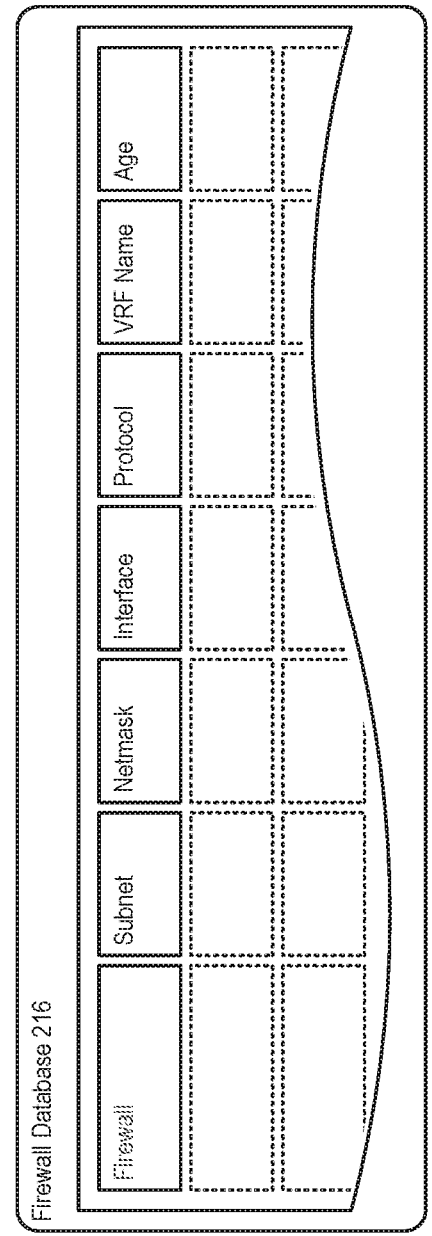
FIG. 4 illustrates an example firewall database, for use with autonomous firewall rule management, in accordance with an embodiment.

FIG. 4 illustrates an example firewall database, for use with autonomous firewall rule management, in accordance with an embodiment.

| Firewall Database | | | | | | |
|---|---|---|---|---|---|---|
| Firewall | Subnet | Netmask | Interface | Protocol | VRF Name | Age |

As illustrated in FIG. 4, in accordance with an embodiment, an example firewall database table can include a definition, for each firewall, the subnets, netmask, interfaces, protocols, VRF names, and age associated with that firewall.

Figure 5:
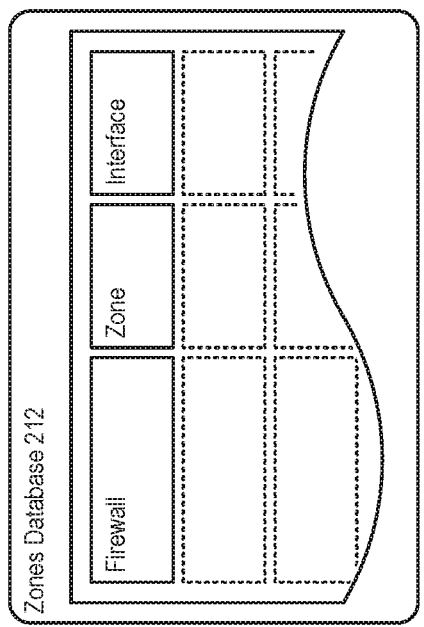
FIG. 5 illustrates an example zones database, for use with autonomous firewall rule management, in accordance with an embodiment.

FIG. 5 illustrates an example zones database, for use with autonomous firewall rule management, in accordance with an embodiment.

| Zones Database | | |
|---|---|---|
| Firewall | Zone | Interface |

As illustrated in FIG. 5, in accordance with an embodiment, an example zones database table can include a definition, for each firewall, of zones and interfaces associated with that firewall.

In accordance with an embodiment, each of the above network database/table, firewall database/table, and zones database/table, can be pre-populated by a combination of inventory management and configuration management tools.

Figure 6:
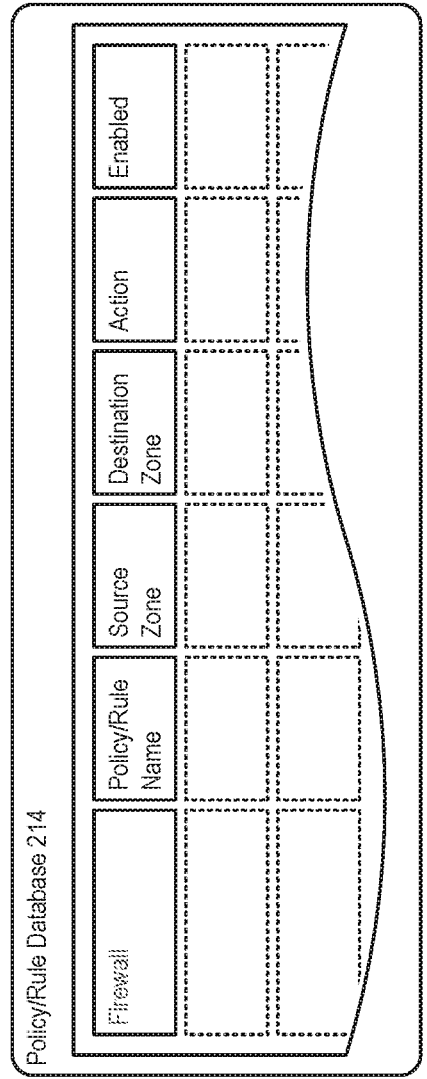
FIG. 6 illustrates an example policy/rule database, for use with autonomous firewall rule management, in accordance with an embodiment.

FIG. 6 illustrates an example policy/rule database, for use with autonomous firewall rule management, in accordance with an embodiment.

| Policy/Rule Database | | | | | |
|---|---|---|---|---|---|
| Firewall | Policy/Rule Name | Source Zone | Destination Zone | Action | Enabled |

As illustrated in FIG. 6, in accordance with an embodiment an example policy/rule database table can include, for each firewall, one or more policy/rule names, source zones, destination zones, actions, and whether the policy/rule is enabled for that firewall.

Rule Generation Algorithm

Figure 7:
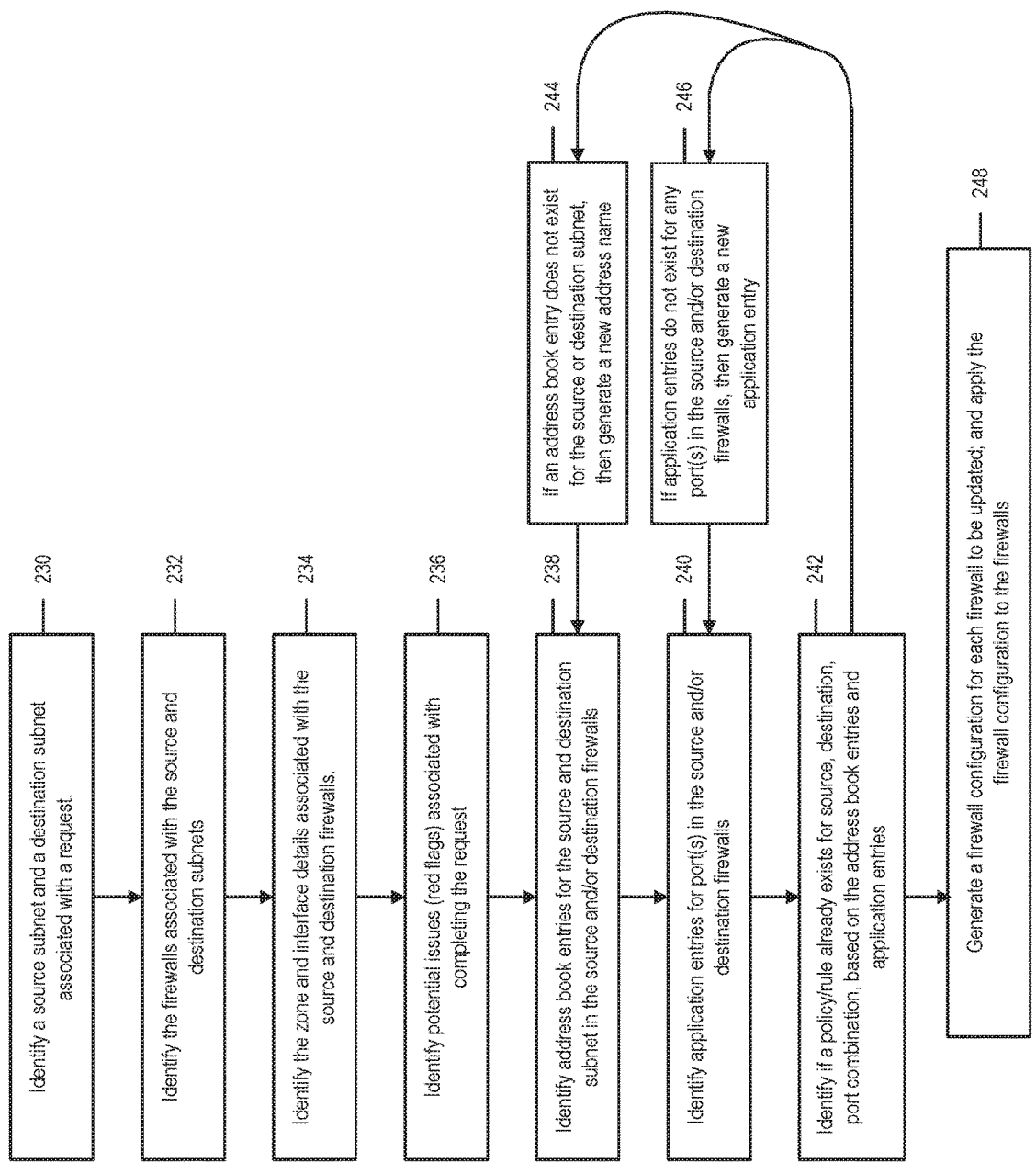
FIG. 7 illustrates a flowchart of a method or process for autonomous firewall rule management, in accordance with an embodiment.

FIG. 7 illustrates a flowchart of a method or process for autonomous firewall rule management, in accordance with an embodiment.

As illustrated in FIG. 7, in accordance with an embodiment, the rule generator can execute or run a process or algorithm to find the set of firewalls which needs to be updated per the user request, as further described below.

1. Identify Source and Destination Subnets

In accordance with an embodiment, at step 230, the firewall rule management automation framework identifies a source subnet and a destination subnet associated with the request, for example by referencing a networks file. If the request is made for a subnet then the system will always consider the subnet mask from the networks file which is the actual source of truth and is the standard.

In accordance with an embodiment, if the subnet is not found, then the system sets the zone to UNTRUST (for public IP addresses). In accordance with an embodiment, i the subnet net name from the networks file contains Nimbula and NAT, then the system sets the zone to UNTRUST.

2. Identify Firewalls

In accordance with an embodiment, at step 232, the firewall rule management automation framework identifies the firewalls associated with the source and destination subnets provided their zones are not already set to UNTRUST.

For example, in accordance with an embodiment, a public cloud can be provided wherein a wide area network (WAN) can connect two or more public cloud data centers belonging to different regions; and a private interconnect (PI) can support data center traffic directed to the WAN; wherein the environment can use virtual routers, such as a trusted virtual router (trust-vr) containing predefined security zones or user-defined zones, and an untrusted virtual reality (untrust-vr). In accordance with an embodiment, the system can be adapted to look in the trust-vr and inet.0 routing tables (both of which are trusted virtual routing tables) for the identified subnet, where protocol is direct, and route destination is not '0.0.0.0', and (egress) interface is not reth0.2310, and (egress) zone is not among PI, UNTRUST, TRUST, and WAN.

In accordance with an embodiment, if the above does not return any result, the system can be adapted to then look in the trust-yr routing table, where route destination is not '0.0.0.0', and (egress) interface is not reth0.2310, and (egress) zone is not among PI, UNTRUST, TRUST, and WAN. If the above does not return any result, then the system can repeat this step for the inet.0 routing table.

The above-described examples of a public cloud, and various additional examples provided herein, are provided for purposes of illustration; and are not intended to limit the scope of protection to the particular examples described.

3. Identify Zone and Interface Details

In accordance with an embodiment, at step 234, the firewall rule management automation framework identifies the zone and interface details associated with the source and destination firewalls.

For example, in accordance with an embodiment that uses virtual routers as described above, the system can first look in trust-yr, and if not found then in inet.0) for each of the following:

(zone1, inf1)—source IP in source firewall, ingress zone, ingress interface.

(zone2, inf2)—destination IP in source firewall, egress zone, egress interface.

(zone3, inf3)—source IP in destination firewall, ingress zone, ingress interface.

(zone4, inf4)—destination IP in destination firewall, egress zone, egress interface.

4. Identify Potential Issues

In accordance with an embodiment, at step 236, the firewall rule management automation framework identifies potential issues (red flags) associated with completing the request; for example, wherein the user request cannot be completed by the automation.

For example, in accordance with an embodiment, it is a red flag if:

Both source and destination firewalls are unknown.

There are multiple firewalls associated with a subnet.

The source firewall is known and any one of zone2 or inf2 is unknown (zone 1 and inf1 will always be known if source firewall is known).

The destination firewall is known and any one of zone3 or inf3 is unknown (zone4 and inf4 will always be known if destination firewall is known).

The source firewall is unknown and destination firewall is known, and zone3 is neither UNTRUST nor TRUST.

The destination firewall is unknown and source firewall is known, and zone2 is neither UNTRUST nor TRUST.

Both zone2 and zone3 are different.

Both zone2 and zone3 are TRUST and vlan of inf2 and inf3 are different.

5. Identify Address Book Entries

In accordance with an embodiment, at step 238, the firewall rule management automation framework determines address book entries for the source and destination subnet in the source and/or destination firewalls.

For example, in accordance with an embodiment, if the source/destination address is an IP, the system can check if entries exist for: (1) the IP; (2) the subnet of the IP; (3) any groups the IP belongs to; (4) any groups the subnet of the IP belongs to.

If the source/destination address is a subnet, the system can check if entries exist for: (1) the subnet; (2) any groups the subnet belongs to.

6. Identify Application Entries

In accordance with an embodiment, at step 240, the firewall rule management automation framework identifies application entries for port(s)/(any groups containing the port(s)) in the source and/or destination firewalls.

7. Identify if Policies/Rules Exist

In accordance with an embodiment, at step 242, the firewall rule management automation framework identifies if a policy/rule already exists for source, destination, port combination, based on the address book entries and application entries identified above. Both for global zones and from/to the respective source/destination zones.

8. Generate Address Names

In accordance with an embodiment, at step 244, if an address book entry does not exist for the source or destination subnet, then the firewall rule management automation framework generates a new address name. For example, an address name can be generated as <location>-<subnet> (e.g., nl1-amsterdam-colo-opc-v1160-10.12.72.128/25) under 'global' address book. If the location (net name) is unknown, then the system can use 'inet' instead (1-63 characters limit).

9. Generate Application Entries

In accordance with an embodiment, at step 246, if application entries do not exist for any port(s) in the source and/or destination firewalls, then the firewall rule management automation framework generates a new application entry, for example as <protocol>-<port> (e.g., tcp-443).

10. Generate Firewall Configuration

In accordance with an embodiment, at step 248, the firewall rule management automation framework generates a firewall configuration for each firewall to be updated, based on the firewall policies/rules generated; and apply the firewall configuration to the firewalls The above is provided by way of example, to illustrate the use of an embodiment of the firewall rule management automation framework with a particular environment. In accordance with other embodiments, the firewall rule management automation framework can be adapted to perform similar functions that are appropriate to those environments.

Rule Applier

In accordance with an embodiment, the rule applier can use a device-independent provisioning/configuration data, for example, as provided by an Ansible playbook or other type of provisioning/configuration data format, to apply the rule configuration on to the firewalls as dictated by the rule generator.

For example, in accordance with an embodiment, an Ansible environment or other provisioning/configuration tool can receive as input: a list of one or more firewall names; and a configuration to be applied for each firewall, such as, for example, for a single firewall:

{"firewall-name": "FIREWALL_DEVICE_1", "metadata": {"domain": "some_dc.oraclecloud.com", "vendor": "juniper", "model": "srx3600"}, "address_book": {"cmds": ["set security address-book global address DataCenter-123.44.55.678/32 123.44.55.678/32"]}}

In accordance with an embodiment, in the above example, the rule applier will apply the config present in the "cmds" dictionary key ("set command") to the firewall device (FIREWALL_DEVICE_1).

The above-described example is provided for purposes of illustration; and is not intended to limit the scope of protection to the particular example described.

Figure 8:
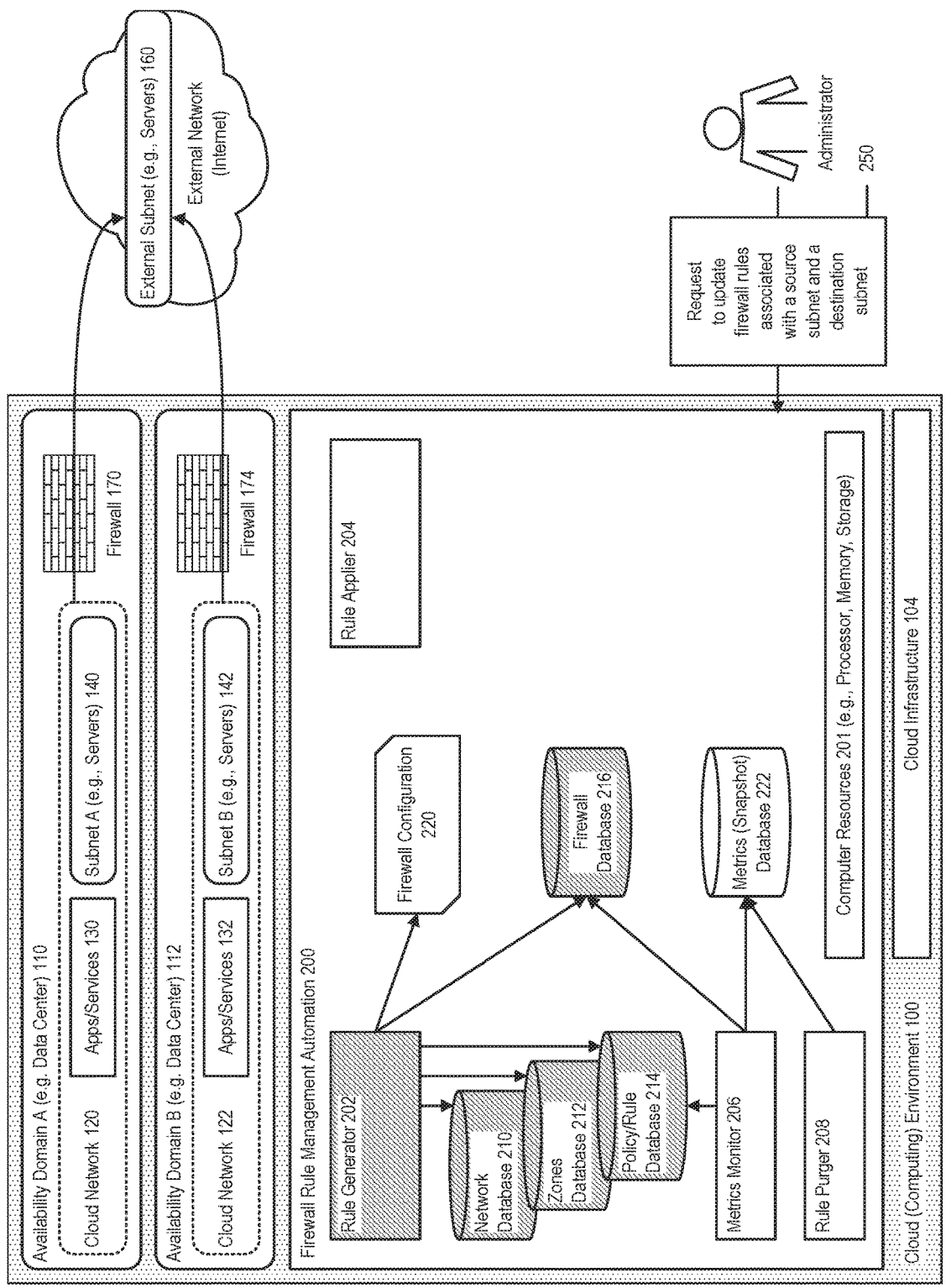
FIG. 8 illustrates use of the system for autonomous firewall rule management, in accordance with an embodiment.

FIG. 8 illustrates use of the system for autonomous firewall rule management, in accordance with an embodiment.

As illustrated in FIG. 8, in accordance with an embodiment, a request 250 is received to update firewall rules associated with a source subnet and a destination subnet.

Figure 9:
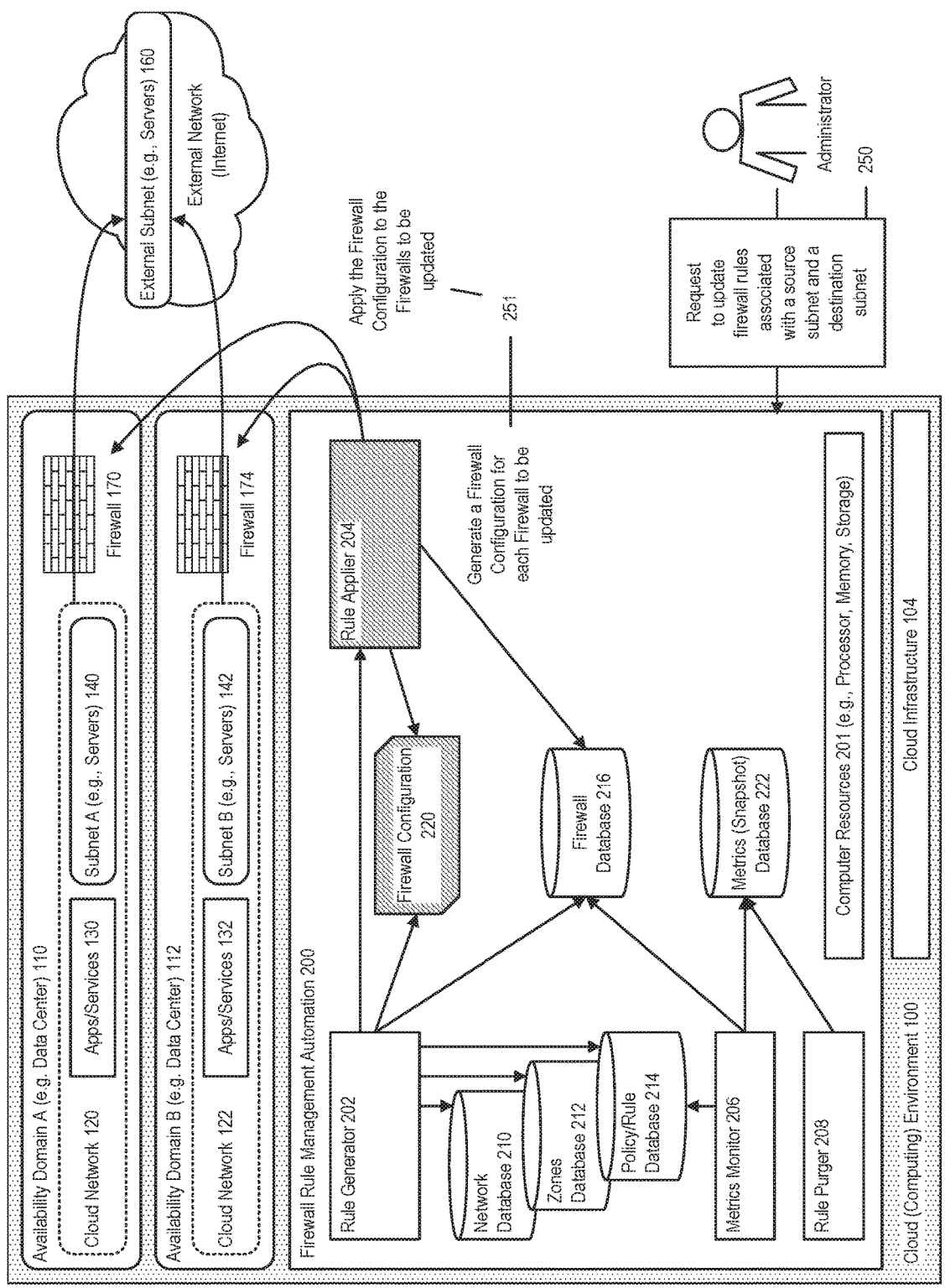
FIG. 9 further illustrates use of the system for autonomous firewall rule management, in accordance with an embodiment.

FIG. 9 further illustrates use of the system for autonomous firewall rule management, in accordance with an embodiment.

As illustrated in FIG. 9, in accordance with an embodiment, the firewall rule management automation framework uses a process as described above to generate a firewall configuration for each firewall to be updated, and apply the firewall configuration to the firewalls (251).

Figure 10:
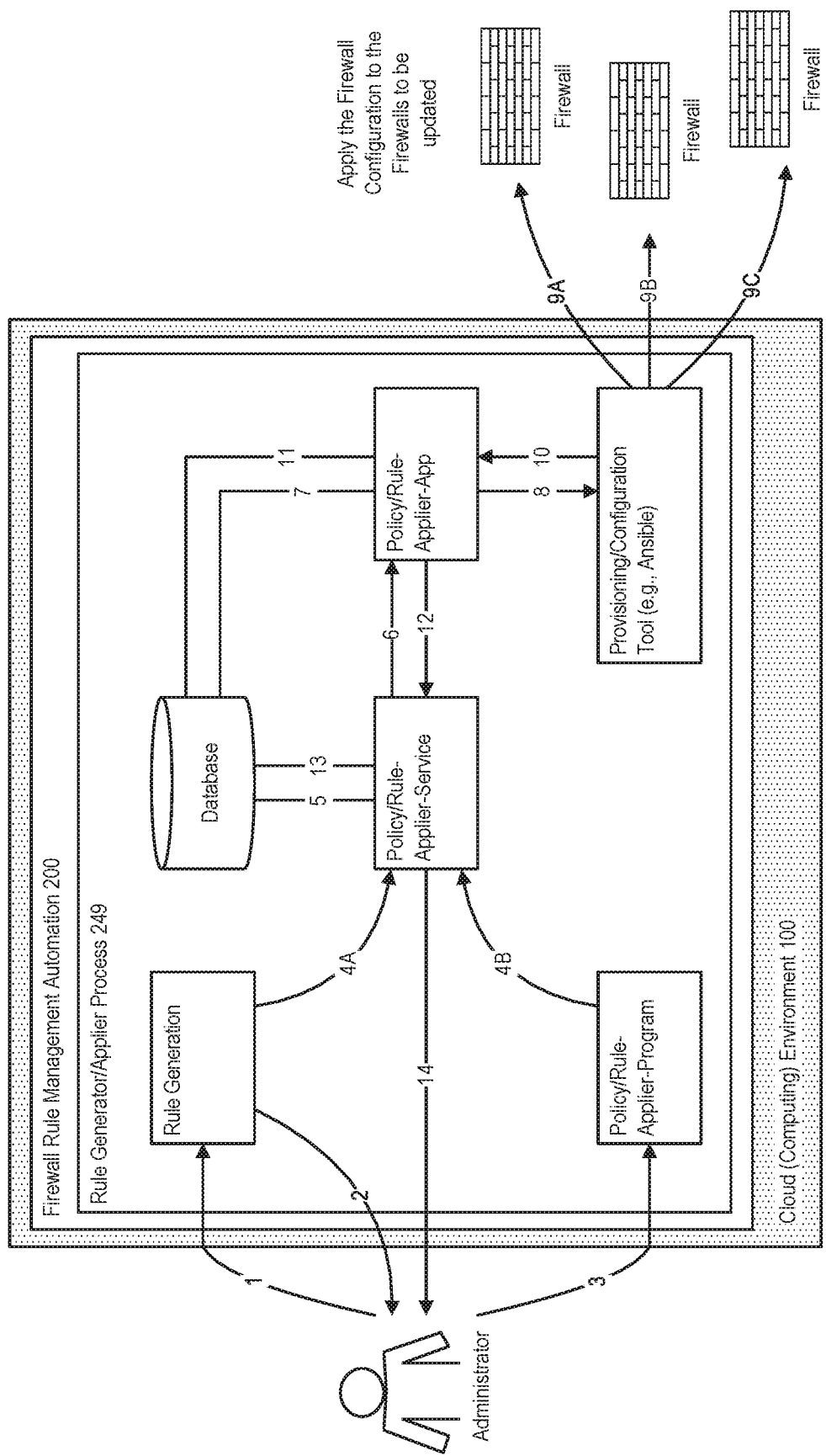
FIG. 10 illustrates a process associated with an example implementation of a rule applier, in accordance with an embodiment.

FIG. 10 illustrates a process associated with an example implementation of a rule applier, in accordance with an embodiment.

As illustrated in FIG. 10, in accordance with an embodiment, an example implementation of a firewall rule management automation framework (referred to herein as FiRMS) comprises a plurality of software services that operate asynchronously and communicate, for example via a message queue or database, including in this example a policy/rule-applier-program (PAP); a policy/rule-applier-service (PAS); and a policy/rule-applier-app (APP).

In accordance with an embodiment, the policy/rule-applier-program operates so that:

At (1) a user (for example, an administrator) can submit a request, for example by running a rule generation function together with an input data containing a list of source and destinations IP addresses or subnets.

At (2) the rule generation function generates rules/policies, and stores the rules/policies, for example as a JSON policy file in the user's home directory, together with a reference-ID associated with the request.

At (3) the user invokes the policy/rule-applier-program with the reference-ID, a ticket-number, and an email-identifier.

At (4A, 4B) the policy/rule-applier-program finds the corresponding JSON policy file, and creates a message and header with information that enables the message to be consumed by the policy/rule-applier-service, and publishes the message to the message queue for consumption by the policy/rule-applier-service.

In accordance with an embodiment, the policy/rule-applier-service comprises two consumer processes (daemons), including a first daemon that consumes incoming requests sent by the policy/rule-applier-service; and a second daemon that consumes outgoing responses sent by the policy/rule-applier-app after a request is processed; wherein during the processing of a request:

In accordance with an embodiment, at (5) the policy/rule-applier-service consumes messages from an input queue, and checks if a request has already been processed, using its reference-ID. If the request has already been processed, the policy/rule-applier-service fetches the corresponding result from the database, and sends an e-mail or otherwise notifies the user, including for example, notifying the path in which the result is stored.

In accordance with an embodiment, if the request has not already been processed, then at (6), the policy/rule-applier-service transforms the message to a format compatible with the policy/rule-applier-app; stores the data in an applier-service table; and publishes the message to be consumed by the policy/rule-applier-app.

In accordance with an embodiment, during the processing of a response:

At (12), the policy/rule-applier-service consumes the response from an output queue.

At (13), the policy/rule-applier-service stores the response in an applier-service table.

At (14) the policy/rule-applier-service writes the message to the user's home directory, for example based on reference-ID; and an e-mail is sent to the user notifying the status of the request, and a file path if the request is processed successfully.

In accordance with an embodiment, the policy/rule-applier-app (APP) comprises a consumer process (daemon) which:

At (6) consumes a message from the message queue.

At (7) checks in the database if the corresponding reference-ID has already been processed; and if processed, fetches the result from the database and publishes it; or if not processed, then:

At (8) constructs an inventory and commands, dynamically from the received message; and At (9A, 9B, 9C) provides the inventories, commands and any other information, for example, a playbook, to a provisioning/configuration tool such as, for example, an Ansible engine or other provisioning/configuration tool.

In accordance with an embodiment, the provisioning/configuration tool (e.g. Ansible or other provisioning/configuration tool) is adapted to configure the firewall devices from inventories with corresponding commands, including, for example:

At (10) a response is collected from each firewall device and is given to the caller.

At (11) the policy/rule-applier-app constructs a response, for example, as a JSON message, collected from all the firewall devices, which is stored in the database corresponding to the reference-ID.

At (12) the message is published.

In accordance with an embodiment, the various components and processes illustrated in FIG. 10 can be provided as software or program code executable by a computer system or other type of processing device. The example illustrated in FIG. 10 the purposes of illustration and description; and is not intended to be exhaustive or to limit the scope of protection to the precise forms disclosed.

Metrics Monitor

In accordance with an embodiment, the metrics monitor periodically polls all of the firewalls with each policy/rule and hit count. It also polls the firewall when it was rebooted last time (last reboot time). The system can call each polling time as a snapshot, and the metrics monitor populates a metrics (snapshot) database as described below.

Figure 11:
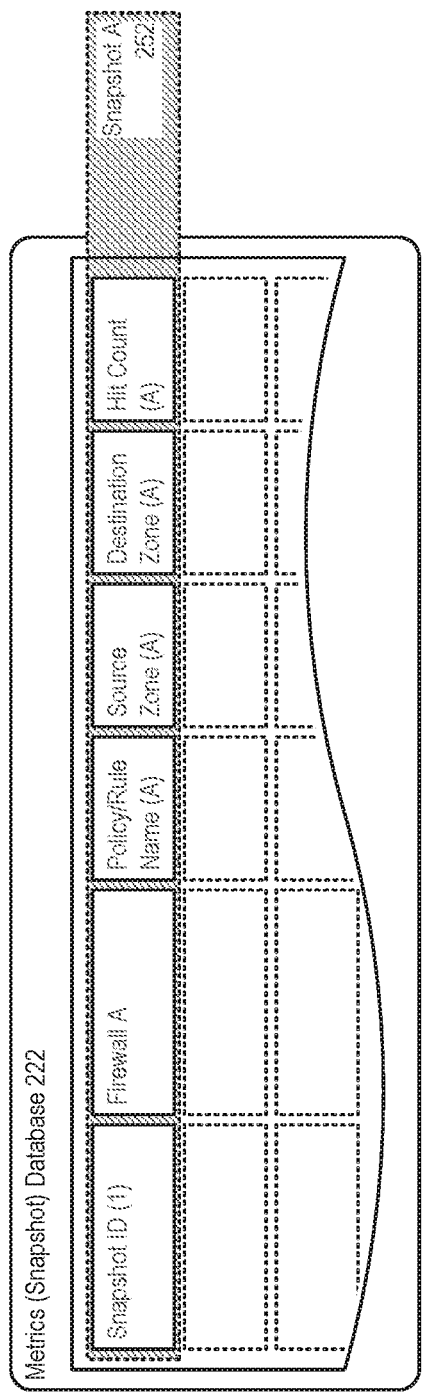
FIG. 11 illustrates the use of a metrics (snapshot) database for autonomous firewall rule management, in accordance with an embodiment.

FIG. 11 illustrates the use of a metrics (snapshot) database for autonomous firewall rule management, in accordance with an embodiment.

As illustrated in FIG. 11, in accordance with an embodiment, a snapshot 252 can be recorded at periods of time.

| Metrics (Snapshot) Database | | | | | |
| --- | --- | --- | --- | --- | --- |
| Snapshot ID | Firewall | Policy/Rule Name | Source Zone | Destination Zone | Hit Count |

Figure 12:
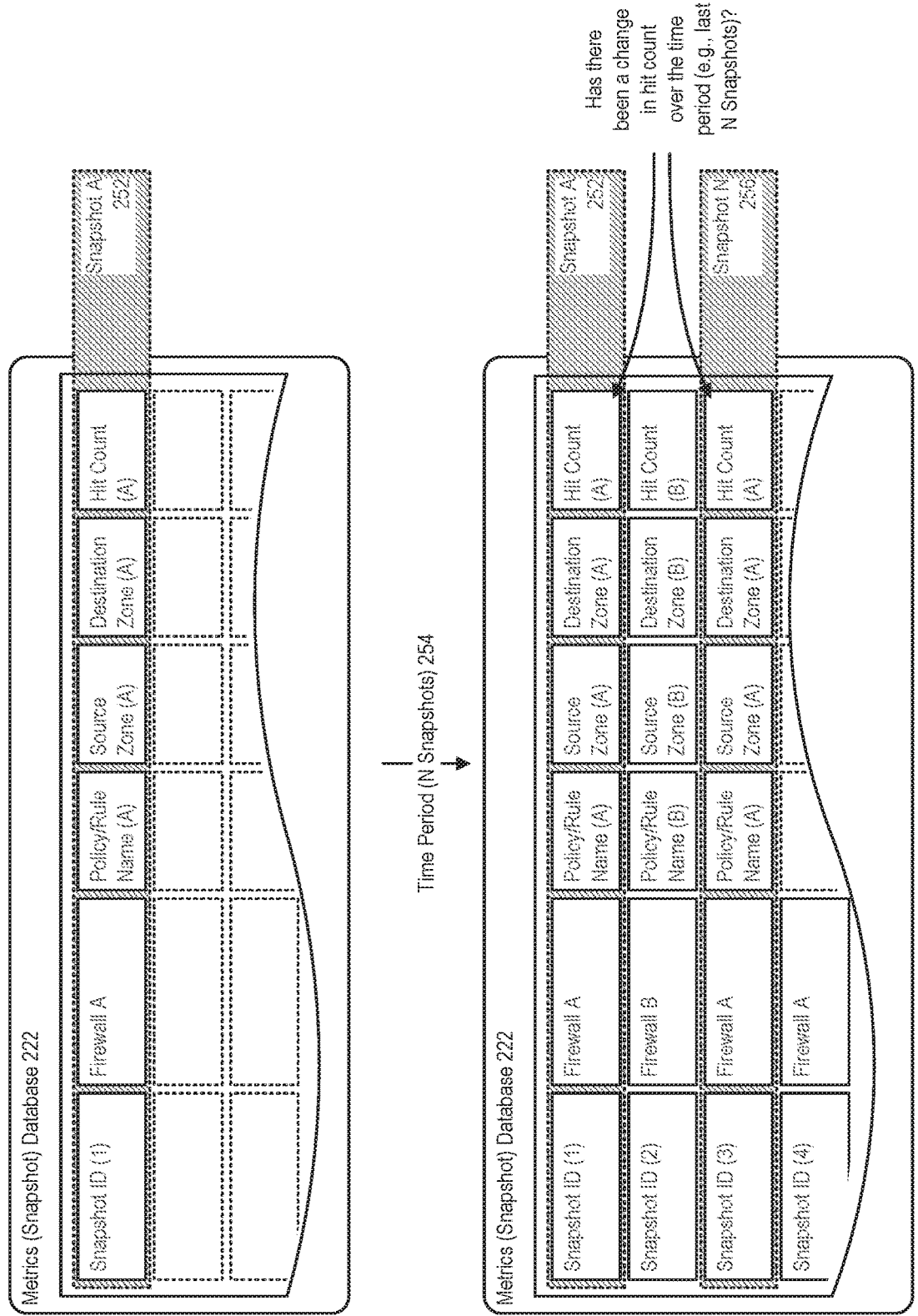
FIG. 12 further illustrates the use of metrics snapshots for autonomous firewall rule management, in accordance with an embodiment.

FIG. 12 further illustrates the use of metrics snapshots for autonomous firewall rule management, in accordance with an embodiment.

As illustrated in FIG. 12, in accordance with an embodiment, the snapshot ID can be incremented each time the metrics are polled from all firewalls. After a period of time (or, for example, N snapshots) 254, a second snapshot 256 can be recorded for that firewall, in this example firewall A. The system can use this information to determine whether there has been a change in hit count over the time period (for example, over the last N snapshots).

Rule Purger

Figure 13:
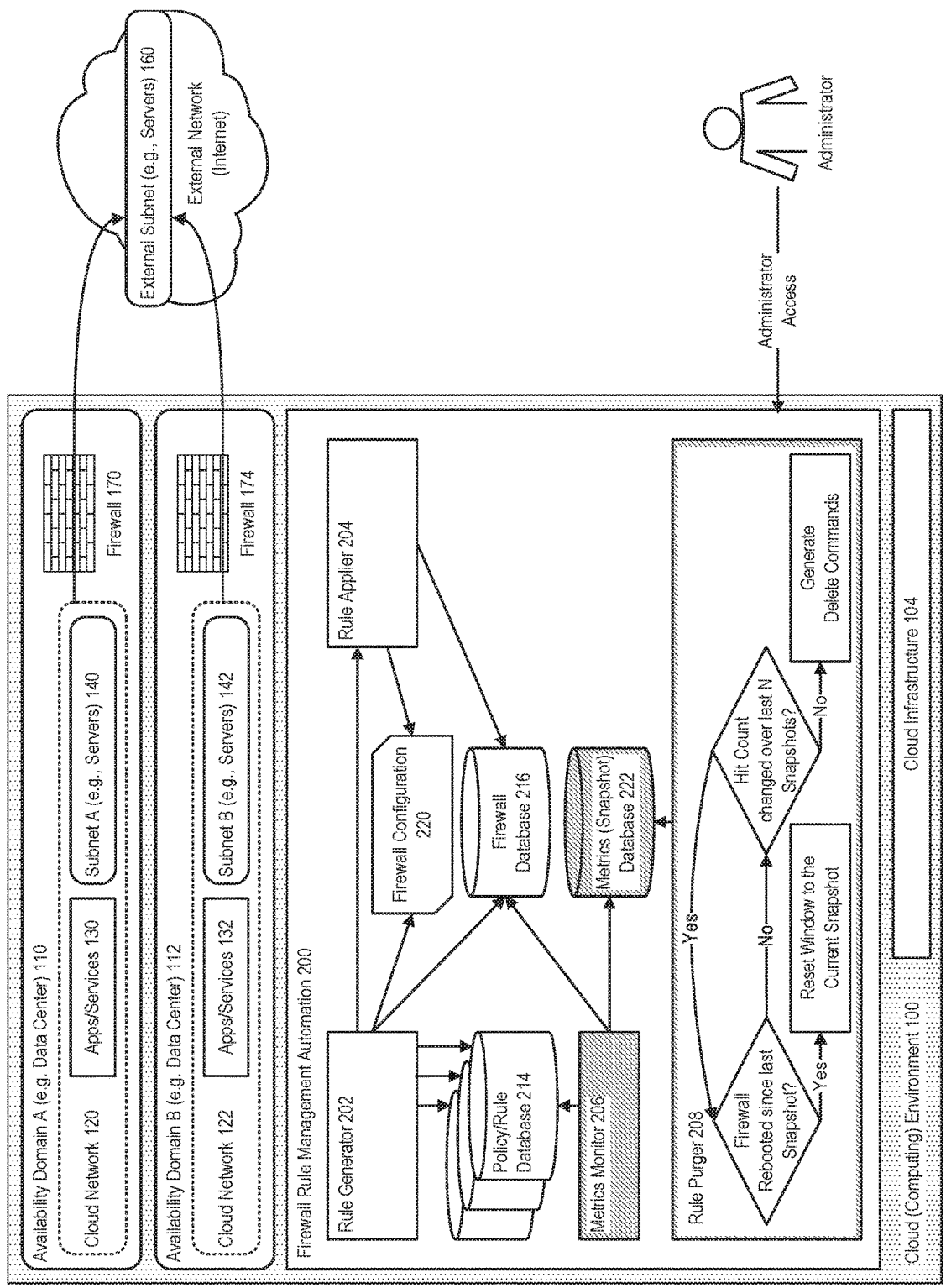
FIG. 13 further illustrates the use of metrics snapshots for autonomous firewall rule management, in accordance with an embodiment.

FIG. 13 further illustrates the use of metrics snapshots for autonomous firewall rule management, in accordance with an embodiment.

As illustrated in FIG. 13, in accordance with an embodiment, the rule purger will scan the metrics database and check if any of the policies/rules are obsolete, for example if the hit count associated with a particular policy/rule has changed, and if the network device providing the firewall) was rebooted between the recording of a prior metrics snapshot and a subsequent/current (Nth) metrics snapshot.

Figure 14:
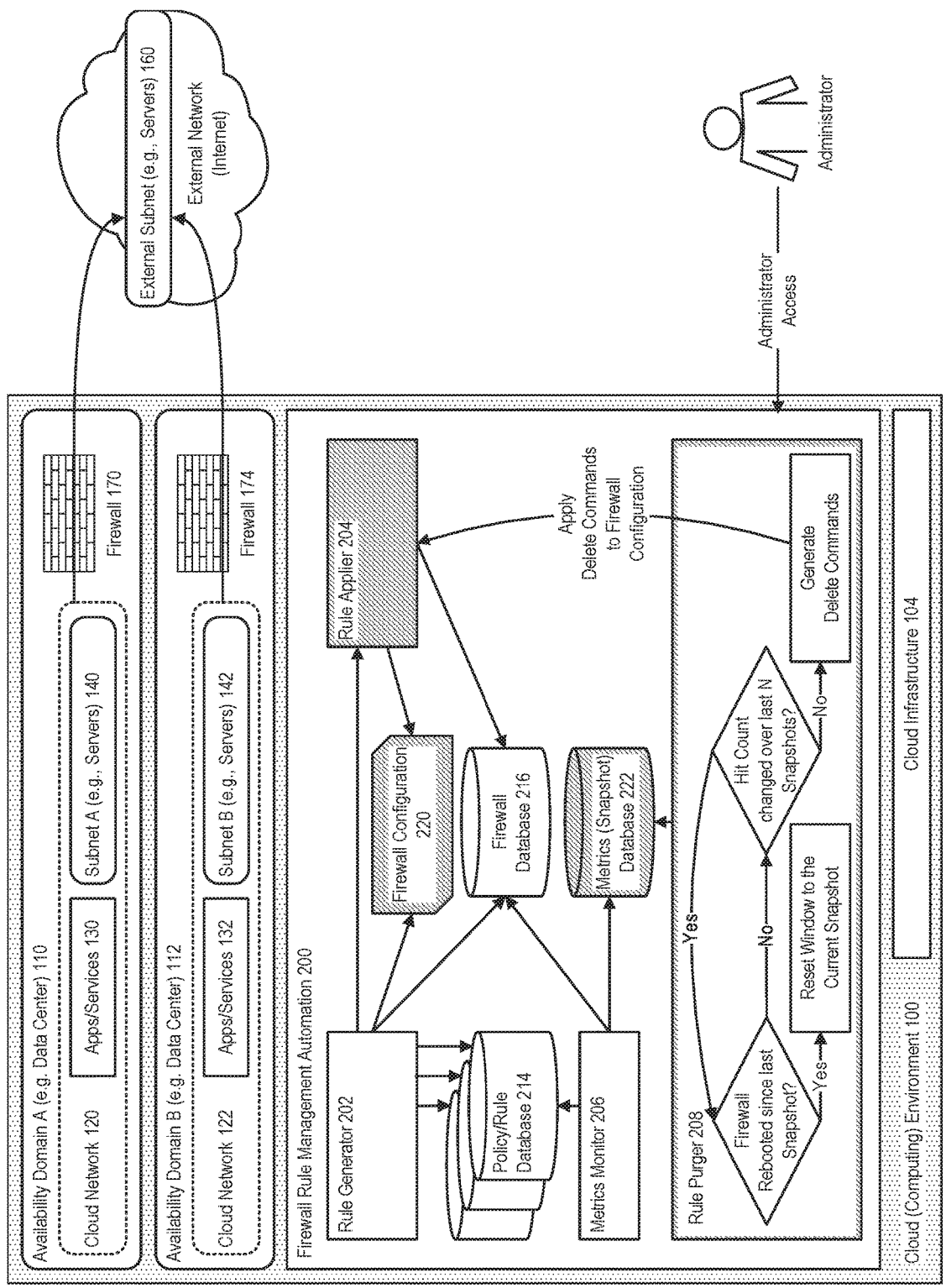
FIG. 14 further illustrates the use of metrics snapshots for autonomous firewall rule management, in accordance with an embodiment.

FIG. 14 further illustrates the use of metrics snapshots for autonomous firewall rule management, in accordance with an embodiment.

As illustrated in FIG. 14, in accordance with an embodiment, if it is determined there was no reboot of the network device identified in the previous step, between the recording of the prior metrics snapshot and the subsequent/current (Nth) metrics snapshot, then the associated policy/rule can be deleted from the firewall.

Figure 15:
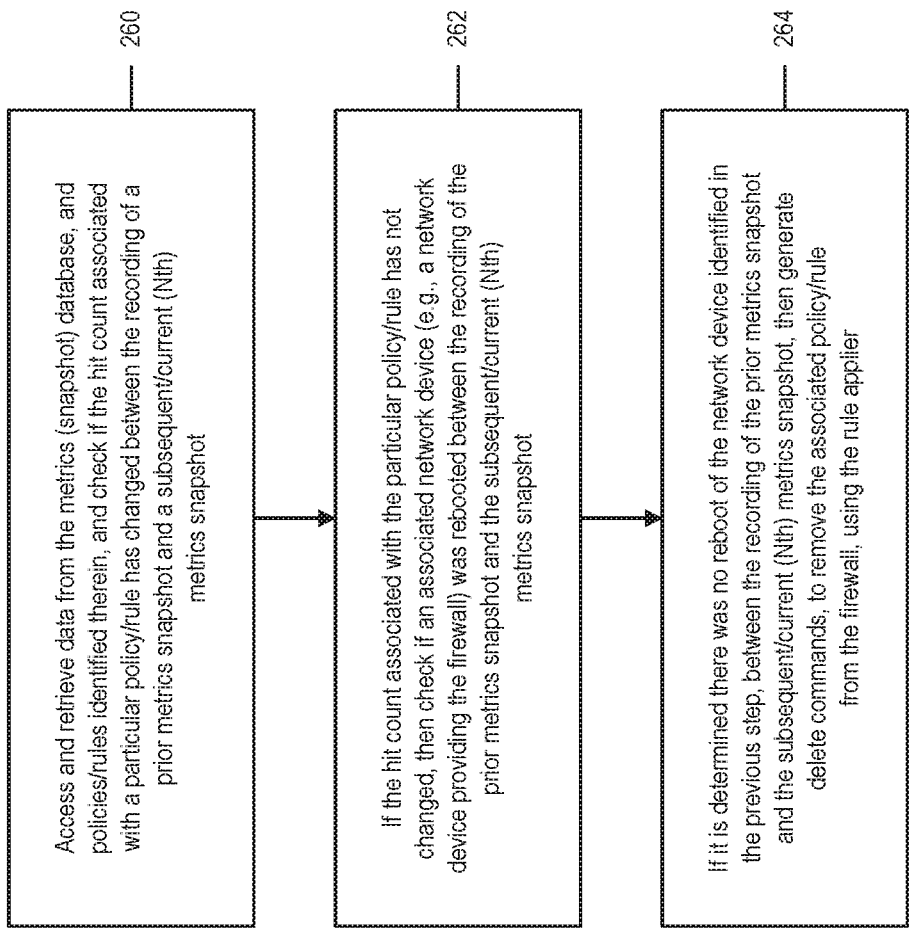
FIG. 15 illustrates a flowchart of a method or process for use of metrics snapshots for autonomous firewall rule management, in accordance with an embodiment.

FIG. 15 illustrates a flowchart of a method or process for use of metrics snapshots for autonomous firewall rule management, in accordance with an embodiment.

As illustrated in FIG. 15, in accordance with an embodiment, at step 260, the firewall rule management automation framework accesses and retrieves data from the metrics (snapshot) database, and policies/rules identified therein, and check if the hit count associated with a particular policy/rule has changed between the recording of a prior metrics snapshot and a subsequent/current (Nth) metrics snapshot In accordance with an embodiment, at step 262, if the hit count associated with the particular policy/rule has not changed, then check if an associated network device (for example, a network device providing the firewall) was rebooted between the recording of the prior metrics snapshot and the subsequent/current (Nth) metrics snapshot In accordance with an embodiment, at step 264, if it is determined there was no reboot of the network device identified in the previous step, between the recording of the prior metrics snapshot and the subsequent/current (Nth) metrics snapshot, then the system can generate delete commands, to remove the associated policy/rule from the firewall, using the rule applier.

Example Technical Advantages

In accordance with various embodiments, examples of various technical advantages of the systems and methods described herein can include:

Embodiments of the systems and methods described herein can provide autonomous management of firewall rules.

Embodiments of the systems and methods described herein can provide scale of managing firewall rules.

Embodiments of the systems and methods described herein can reduce the manual intervention to almost zero and saves many person-hours.

Embodiments of the systems and methods described herein can provide improvement in low latency requirements, for example by automatically identifying and deleting obsoleted firewall rules.

Embodiments of the systems and methods described herein provide an environment/solution that is highly applicable for all cloud providers.

In accordance with various embodiments, implementations of the systems and methods described herein can include, for example, a use of a 30 day period for taking snapshot of the metrics; or, for example, a minimum of 90 days of an observing period (or for example, a last 3 snapshots) to be considered for purging the policies/rules with no hits from firewalls.

The above examples of technical advantages are provided for purposes of illustration; and are not intended to be exhaustive or to limit the scope of protection to the precise forms or technical advantages described. In accordance with various embodiments, additional technical advantages can be provided.

In accordance with various embodiments, the teachings herein can be implemented using one or more general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for autonomous firewall rule management, for use with a cloud computing environment or other type of network environment, comprising:
   a computer or other electronic device including a processor, and having a firewall rule management automation framework operating thereon and adapted to automatically:
   determine firewalls that can receive network traffic from a given source subnet or destination subnet;
   configure the firewalls with required firewall rules;
   monitor the firewall rules through collection of metrics snapshots and rule hit counts; and
   purge underused or potentially obsolete firewall rules;
   wherein the firewall rule management automation framework comprises a rule generator adapted to:
      receive, as a user request, an input source subnet and destination subnets, a protocol, and one or more source port and destination ports that are to be blocked or permitted;
      search within network database and route tables, to identify a set of firewalls and zones wherein the rule is to be configured in accordance with the user request; and
      wherein a firewall configuration is generated and applied to each of the identified firewalls.

2. The system of claim 1, wherein the firewall rule management automation framework comprises a rule applier adapted to use device-independent playbooks to apply a rule configuration to one or more different types of firewalls as dictated by the rule generator.

3. The system of claim 1, wherein the firewall rule management automation framework comprises a metrics monitor that periodically polls firewalls configured with each rule and determines a hit count, to create a snapshot and populate a metrics database.

4. The system of claim 2, wherein the firewall rule management automation framework comprise a rule purger that scans the metrics database and checks if any of the rules identified therein are obsolete, and if so then removes that rule from the firewall using the rule applier.

5. A method for providing an autonomous firewall rule management framework, for use with a cloud computing environment or other type of network environment, comprising:
   automatically determining firewalls that can receive network traffic from a given source subnet or destination subnet;
   automatically configuring the firewalls with required firewall rules, comprising:
      receiving, as a user request, an input source subnet and destination subnets, a protocol, and one or more source port and destination ports that are to be blocked or permitted;
      searching within network database and route tables, to identify a set of firewalls and zones wherein the rule is to be configured in accordance with the user request;
      wherein a firewall configuration is generated and applied to each of the identified firewalls;
   monitoring the firewall rules through collection of metrics snapshots and rule hit counts; and
   purging underused or potentially obsolete firewall rules.

6. The method of claim 5, wherein the firewall rule management automation framework comprises a rule applier adapted to use device-independent playbooks to apply a rule configuration to one or more different types of firewalls as dictated by the rule generator.

7. The method of claim 5, wherein the firewall rule management automation framework comprises a metrics monitor that periodically polls firewalls configured with each rule and determines a hit count, to create a snapshot and populate a metrics database.

8. The method of claim 7, wherein the firewall rule management automation framework comprise a rule purger that scans the metrics database and checks if any of the rules identified therein are obsolete, and if so then removes that rule from the firewall using the rule applier.

9. A non-transitory computer readable storage medium, including instructions stored thereon which when read and executed by at least one of a computer or other electronic device causes the at least one of a computer or other electronic device to provide a firewall rule management framework and perform a method comprising:
   automatically determining firewalls that can receive network traffic from a given source subnet or destination subnet;
   automatically configuring the firewalls with required firewall rules, comprising:
      receiving, as a user request, an input source subnet and destination subnets, a protocol, and one or more source port and destination ports that are to be blocked or permitted;
      searching within network database and route tables, to identify a set of firewalls and zones wherein the rule is to be configured in accordance with the user request;
      wherein a firewall configuration is generated and applied to each of the identified firewalls;
   monitoring the firewall rules through collection of metrics snapshots and rule hit counts; and
   purging underused or potentially obsolete firewall rules.

10. The non-transitory computer readable storage medium of claim 9, wherein the firewall rule management automation framework comprises a rule applier adapted to use device-independent playbooks to apply a rule configuration to one or more different types of firewalls as dictated by the rule generator.

11. The non-transitory computer readable storage medium of claim 9, wherein the firewall rule management automation framework comprises a metrics monitor that periodically polls firewalls configured with each rule and determines a hit count, to create a snapshot and populate a metrics database.

12. The non-transitory computer readable storage medium of claim 10, wherein the firewall rule management automation framework comprise a rule purger that scans the metrics database and checks if any of the rules identified therein are obsolete, and if so then removes that rule from the firewall using the rule applier.

13. The system of claim 1, wherein the system is provided within a cloud computing environment for use with one or more cloud networks.

14. The method of claim 5, wherein the method is performed within a cloud computing environment for use with one or more cloud networks.

15. The non-transitory computer readable storage medium of claim 9, wherein the method is performed within a cloud computing environment for use with one or more cloud networks.

* * * * *